United States Patent
Wang et al.

(10) Patent No.: US 11,178,686 B2
(45) Date of Patent: Nov. 16, 2021

(54) METHOD AND APPARATUS FOR TRANSMITTING AND DETECTING DOWNLINK CONTROL INFORMATION

(71) Applicant: China Academy of Telecommunications Technology, Beijing (CN)

(72) Inventors: Lei Wang, Beijing (CN); Xuejuan Gao, Beijing (CN); Fang-Chen Cheng, Beijing (CN); Shaohui Sun, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 171 days.

(21) Appl. No.: 16/073,233

(22) PCT Filed: Jan. 19, 2017

(86) PCT No.: PCT/CN2017/071731
§ 371 (c)(1),
(2) Date: Jul. 26, 2018

(87) PCT Pub. No.: WO2017/129035
PCT Pub. Date: Aug. 3, 2017

(65) Prior Publication Data
US 2019/0045531 A1    Feb. 7, 2019

(30) Foreign Application Priority Data
Jan. 29, 2016    (CN) .......................... 201610066477.9

(51) Int. Cl.
*H04W 72/12* (2009.01)
*H04W 72/04* (2009.01)
(Continued)

(52) U.S. Cl.
CPC ....... *H04W 72/1289* (2013.01); *H04L 5/0048* (2013.01); *H04L 5/0053* (2013.01);
(Continued)

(58) Field of Classification Search
None
See application file for complete search history.

(56) References Cited

U.S. PATENT DOCUMENTS

| 2011/0249633 | A1  | 10/2011 | Hong et al. |
| 2014/0348123 | A1* | 11/2014 | Zhou ............... H04L 5/0053 370/330 |

(Continued)

FOREIGN PATENT DOCUMENTS

| CN | 1622502 A   | 6/2005 |
| CN | 102447538 A | 5/2012 |

(Continued)

OTHER PUBLICATIONS

Huawei, HiSilicon, "Control signaling enhancements for short TTI" 3GPP TSG RAN WG1 Meeting #83, R1-156461, Anaheim, USA, Nov. 15-22, 2015.

*Primary Examiner* — Ruihua Zhang
(74) *Attorney, Agent, or Firm* — Foley & Lardner LLP

(57) ABSTRACT

Disclosed are a method and apparatus for transmitting and detecting downlink control information. The method involves determining a state of resource allocation in a downlink transmission time period, the resource allocation corresponds to allocation of at least one downlink transmission resource region; and transmitting downlink control information on a preset resource in the at least one downlink transmission resource region, the downlink control information being used for scheduling at least one terminal to perform data transmission in the downlink transmission resource region. The method also involves detecting the downlink control information on the preset resource in the (Continued)

downlink transmission time period; determining, according to the detected downlink control information, a data transmission region indicated by the downlink control information; and detecting follow-up downlink control information according to the data transmission region. By using the present invention, downlink control information can be transmitted at a fixed position in each downlink transmission time period, and multiple transmission time intervals of different lengths are supported, so that rich service types in the future can be better supported.

16 Claims, 10 Drawing Sheets

(51) Int. Cl.
*H04W 72/14* (2009.01)
*H04L 5/00* (2006.01)
*H04L 27/26* (2006.01)

(52) U.S. Cl.
CPC ...... *H04L 27/2602* (2013.01); *H04L 27/2605* (2013.01); *H04W 72/042* (2013.01); *H04W 72/0446* (2013.01); *H04W 72/0453* (2013.01); *H04W 72/14* (2013.01); *H04L 5/0007* (2013.01)

(56) References Cited

U.S. PATENT DOCUMENTS

| | | | | |
|---|---|---|---|---|
| 2015/0063151 A1* | 3/2015 | Sadek | ............... | H04W 24/02 370/252 |
| 2016/0255611 A1* | 9/2016 | Damnjanovic | ......... | H04L 5/001 370/330 |
| 2017/0208568 A1* | 7/2017 | Nam | ................ | H04L 5/0048 |
| 2018/0287761 A1* | 10/2018 | You | ................ | H04L 5/0053 |

FOREIGN PATENT DOCUMENTS

| | | |
|---|---|---|
| CN | 103716274 A | 4/2014 |
| CN | 103517420 A | 3/2015 |
| CN | 104468030 A | 3/2015 |
| CN | 105246164 A | 1/2016 |
| EP | 2 341 678 A1 | 7/2011 |
| EP | 2 613 599 A1 | 7/2013 |
| EP | 2 852 234 | 3/2015 |
| KR | 10-2014-0135993 | 11/2014 |
| WO | WO 2007/148930 | 12/2007 |
| WO | WO-2013/140448 A1 | 9/2013 |
| WO | WO-2017/035300 A1 | 3/2017 |

\* cited by examiner

METHOD AND APPARATUS FOR TRANSMITTING AND DETECTING DOWNLINK CONTROL INFORMATION

This application is a National Stage of International Application No. PCT/CN2017/071731, filed Jan. 19, 2017 which claims the benefit of Chinese Patent Application No. 201610066477.9, filed with the Chinese Patent Office on Jan. 29, 2016, and entitled "A method and apparatus for transmitting downlink control information, and a method and apparatus for detecting downlink control information", which is hereby incorporated by reference in its entirety.

FIELD

The present invention relates to the field of wireless communications, and particularly to a method and apparatus for transmitting downlink control information, and a method and apparatus for detecting downlink control information.

BACKGROUND

The mobile Internet is toppling over the traditional mobile communication service paradigm, providing its users with an unprecedented service experience, and affecting various aspects of our working and living profoundly. The mobile Internet will promote further upgrading of the information exchange patterns in our society, and provide the users with enhanced reality, virtual reality, ultra-high definition (3D) videos, a mobile cloud, and other more abundant service experiences. Further development of the mobile Internet will bring a growing amount of future mobile traffic by a factor of thousands, and promote new revolution of the mobile communication technologies and industries. The Internet of Things extends a service range of mobile communication from human to human communication to intelligent human to thing, and thing to thing communication, so that the mobile communication technologies are pervaded into more industries and fields. In future, mobile medical treatments, the Internet of Vehicles, intelligent home, industry control, environmental surveillance, etc., will promote explosive growing of applications over the Internet of Things, so that hundreds of billions of devices will access the network, thus resulting in a real "Internet of Any Things". Also a vast number of devices to be connected, and a diversity of services over the Internet of Things will pose a new technical challenge to mobile communication.

As there are abundant new service demands emerging constantly, there is a higher demand for the performance of future mobile communication systems, e.g., a higher peak rate, a higher user experienced rate, a shorter delay, higher reliability, higher spectrum efficiency, higher energy consumption efficiency, etc., and a required support of a larger number of accessing user equipments, and various types of services. In order to support a vast number of various terminals to be connected, and different types of services, flexible configuration of uplink and downlink resources becomes a general trend of technology development. Future system resources can be divided into different sub-bands for different services, and the sub-bands can be allocated with Transmission Time Intervals (TTIs) with different lengths, so that the various services can be provided.

In the existing Long Term Evolution (LTE) system, the length of a TTI is fixed at 1 ms, one or more Physical Downlink Control Channels (PDCCHs) is or are transmitted in the first N Orthogonal Frequency Division Multiplex (OFDM) symbols in each TTI, or transmitted in a group of PRB pairs in a data region, and a User Equipment (UE) detects a Cell-specific Search Space (CSS) or a UE-specific Search Space (USS) blindly for its own PDCCH according to desirable information. However a drawback in the prior art lies in that there has been absent so far a solution to transmitting a PDCCH when the length of a TTI is variable.

SUMMARY

Embodiments of the invention provide a method and apparatus for transmitting downlink control information, and a method and apparatus for detecting downlink control information so as to propose a solution to transmitting and detecting downlink control information in a dynamic TTI.

An embodiment of the invention provides a method for transmitting downlink control information, the method including:

determining a state of resource allocation in a downlink transmission period of time, wherein the resource allocation comprises allocation of at least one downlink transmission resource region, different time resources or frequency resources or time-frequency resources are occupied by different downlink transmission resource regions, and the downlink transmission period of time comprises at least one symbol, or the length of the downlink transmission period of time is B ms, wherein B is a positive integer; and transmitting downlink control information over reserved resources in the at least one downlink transmission resource region, wherein at least one UE is scheduled in the downlink control information to transmit data in the downlink transmission resource region.

Preferably the reserved resources for transmitting downlink control information are determined in one or a combination of the following schemes:

K1 sub-carriers in the frequency domain, and K2 OFDM symbols in the time domain are occupied by the downlink control information, wherein K1 and/or K2 are/is determined as configured via a higher layer, or K1 and/or K2 are/is determined according to one of a plurality of protocol defined combinations, or K1 and/or K2 are/is determined as signaled in a dedicated signal; and resource positions of the reserved resources are start positions of respective elementary data transmission elements, or start positions of respective downlink transmission resource regions, or specific frequency positions in the first several OFDM symbols in the downlink transmission period of time, or all the OFDM symbols throughout the downlink transmission period of time in the time domain at a specific frequency position in the downlink transmission period of time, or other fixed positions.

Preferably the elementary data transmission elements each are a resource block comprising N sub-carriers by M OFDM symbols, wherein N and M are positive integers.

Preferably when the resource positions of the reserved resources are specific frequency positions in the downlink transmission period of time, the frequency positions are Y SCs in the downlink transmission period of time, wherein the Y SCs can be consecutive or discrete, and Y is a positive integer.

Preferably the downlink control information comprises the ID of the scheduled UE, and/or the size of a data region.

Preferably the downlink control information further comprises the size of an idle region.

An embodiment of the invention provides a method for detecting downlink control information, the method including:

detecting downlink control information over reserved resources in a downlink transmission period of time, wherein the downlink transmission period of time comprises at least one symbol, or the length of the downlink transmission period of time is B ms, wherein B is a positive integer:

determining a data transmission region indicated in the detected downlink control information according to the downlink control information; and detecting subsequent downlink control information in the data transmission region.

Preferably the reserved resources for detecting downlink control information are determined in one or a combination of the following schemes:

K1 sub-carriers in the frequency domain, and K2 OFDM symbols in the time domain are occupied by the downlink control information, wherein K1 and/or K2 are/is determined as configured via a higher layer, or K1 and/or K2 are/is determined according to one of a plurality of protocol defined combinations, or K1 and/or K2 are/is determined as signaled in a dedicated signal; and resource positions of the reserved resources are start positions of respective elementary data transmission elements, or start positions of respective downlink transmission resource regions, or specific frequency positions in the first several OFDM symbols in the downlink transmission period of time, or all the OFDM symbols throughout the downlink transmission period of time in the time domain at a specific frequency position in the downlink transmission period of time, or other fixed positions.

Preferably the elementary data transmission elements each are a resource block comprising N sub-carriers by M OFDM symbols, wherein N and M are positive integers; and when the reserved resources are elementary data transmission elements, downlink control information is detected at a granularity of S1 elementary data transmission elements in the frequency domain, and S2 elementary data transmission elements in the time domain, wherein S1 and S2 are positive integers.

Preferably when the reserved resources are elementary data transmission elements, the elementary data transmission elements each comprise a downlink control channel, or a part of a downlink control channel.

Preferably when the resource positions of the reserved resources are specific frequency positions in the downlink transmission period of time, the frequency positions are Y SCs in the downlink transmission period of time, wherein the Y SCs can be consecutive or discrete, and Y is a positive integer.

Preferably the downlink control information comprises the ID of the scheduled UE, and/or the size of a data region.

Preferably when the downlink control information further comprises the size of an idle region, the method further comprises:

determining the data transmission area and/or the idle area indicated in the detected downlink control information according to the downlink control information; and detecting subsequent downlink control information in other than the data transmission area and/or the idle area.

An embodiment of the invention provides an apparatus for transmitting downlink control information, the apparatus including:

a resource determining module configured to determine a state of resource allocation in a downlink transmission period of time, wherein the resource allocation comprises allocation of at least one downlink transmission resource region, different time resources or frequency resources or time-frequency resources are occupied by different downlink transmission resource regions, and the downlink transmission period of time comprises at least one symbol, or the length of the downlink transmission period of time is B ms, wherein B is a positive integer; and a transmitting module configured to transmit downlink control information over reserved resources in the at least one downlink transmission resource region, wherein at least one UE is scheduled in the downlink control information to transmit data in the downlink transmission resource region.

Preferably the resource determining module is further configured to determine the reserved resources for transmitting downlink control information, in one or a combination of the following schemes:

K1 sub-carriers in the frequency domain, and K2 OFDM symbols in the time domain are occupied by the downlink control information, wherein K1 and/or K2 are/is determined as configured via a higher layer, or K1 and/or K2 are/is determined according to one of a plurality of protocol defined combinations, or K1 and/or K2 are/is determined as signaled in a dedicated signal; and resource positions of the reserved resources are start positions of respective elementary data transmission elements, or start positions of respective downlink transmission resource regions, or specific frequency positions in the first several OFDM symbols in the downlink transmission period of time, or all the OFDM symbols throughout the downlink transmission period of time in the time domain at a specific frequency position in the downlink transmission period of time, or other fixed positions.

Preferably the elementary data transmission elements each are a resource block comprising N sub-carriers by M OFDM symbols, wherein N and M are positive integers.

Preferably when the resource positions of the reserved resources are specific frequency positions in the downlink transmission period of time, the frequency positions are Y SCs in the downlink transmission period of time, wherein the Y SCs can be consecutive or discrete, and Y is a positive integer.

Preferably the downlink control information comprises the ID of the scheduled UE, and/or the size of a data region.

Preferably the downlink control information further comprises the size of an idle region.

An embodiment of the invention provides an apparatus for detecting downlink control information, the apparatus including:

a detecting module configured to detect downlink control information over reserved resources in a downlink transmission period of time, wherein the downlink transmission period of time comprises at least one symbol, or the length of the downlink transmission period of time is B ms, wherein B is a positive integer:

a region determining module configured to determine a data transmission region indicated in the detected downlink control information according to the downlink control information; and the detecting module is further configured to detect subsequent downlink control information in the data transmission region.

Preferably the detecting module is further configured to determine the reserved resources for detecting downlink control information, in one or a combination of the following schemes:

K1 sub-carriers in the frequency domain, and K2 OFDM symbols in the time domain are occupied by the downlink control information, wherein K1 and/or K2 are/is determined as configured via a higher layer, or K1 and/or K2 are/is determined according to one of a plurality of protocol defined combinations, or K1 and/or K2 are/is determined as signaled in a dedicated signal; and resource positions of the reserved resources are start positions of respective elementary data transmission elements, or start positions of respective downlink transmission resource regions, or specific frequency positions in the first several OFDM symbols in the downlink transmission period of time, or all the OFDM symbols throughout the downlink transmission period of time in the time domain at a specific frequency position in the downlink transmission period of time, or other fixed positions.

Preferably the elementary data transmission elements each are a resource block comprising N sub-carriers by M OFDM symbols, wherein N and M are positive integers; and the detecting module is further configured, when the reserved resources are elementary data transmission elements, to detect downlink control information at a granularity of S1 elementary data transmission elements in the frequency domain, and S2 elementary data transmission elements in the time domain, wherein S1 and S2 are positive integers.

Preferably when the reserved resources are elementary data transmission elements, the elementary data transmission elements each comprise a downlink control channel, or a part of a downlink control channel.

Preferably when the resource positions of the reserved resources are specific frequency positions in the downlink transmission period of time, the frequency positions are Y SCs in the downlink transmission period of time, wherein the Y SCs can be consecutive or discrete, and Y is a positive integer.

Preferably the downlink control information comprises the ID of the scheduled UE, and/or the size of a data region.

Preferably the region determining module is further configured, when the downlink control information further comprises the size of an idle region, to determine the data transmission area and/or the idle area indicated in the detected downlink control information according to the downlink control information; and the detecting module is further configured to detect subsequent downlink control information in other than the data transmission area and/or the idle area.

An embodiment of the invention provides an apparatus for transmitting downlink control information, the apparatus comprising: a processor configured to read and execute program in a memory:

to determine a state of resource allocation in a downlink transmission period of time, wherein the resource allocation comprises allocation of at least one downlink transmission resource region, different time resources or frequency resources or time-frequency resources are occupied by different downlink transmission resource regions, and the downlink transmission period of time comprises at least one symbol, or the length of the downlink transmission period of time is B ms, wherein B is a positive integer; and a transceiver configured to transmit data under the control of the processor:

to transmit downlink control information over reserved resources in the at least one downlink transmission resource region, wherein at least one UE is scheduled in the downlink control information to transmit data in the downlink transmission resource region.

An embodiment of the invention provides an apparatus for detecting downlink control information, the apparatus comprising: a processor configured to read and execute program in a memory:

to determine a data transmission region indicated in detected downlink control information according to the downlink control information; and a transceiver configured to transmit data under the control of the processor:

to detect the downlink control information over reserved resources in a downlink transmission period of time, wherein the downlink transmission period of time comprises at least one symbol, or the length of the downlink transmission period of time is B ms, wherein B is a positive integer; and to detect subsequent downlink control information in the data transmission region.

Advantageous effects of the embodiments of the invention are as follows.

In the technical solutions according to the embodiments of the invention, a DL control channel is transmitted at specified fixed positions. The UE searches the respective specified fixed positions for a DL control channel, and can skip over possible DL control channel positions in a data region according to information carried in a DL grant, and obtain the next position at which a DL control channel is to be received. With these solutions, a DL control channel can be transmitted at fixed positions in each downlink transmission period of time, TTIs with various lengths can be supported, and abundant types of services in future can be better supported.

BRIEF DESCRIPTION OF THE DRAWINGS

The drawings described below are intended to provide further understanding of the invention, and constitute a part of the invention, and the exemplary embodiments of the invention, and the description thereof are intended to set forth the invention, but not to limit the invention unduly. In the drawings.

DETAILED DESCRIPTION OF THE EMBODIMENTS

Optional embodiments of the invention will be described below with reference to the drawings.

The existing LTE sub-frame is structured as follows.

Figure 1:
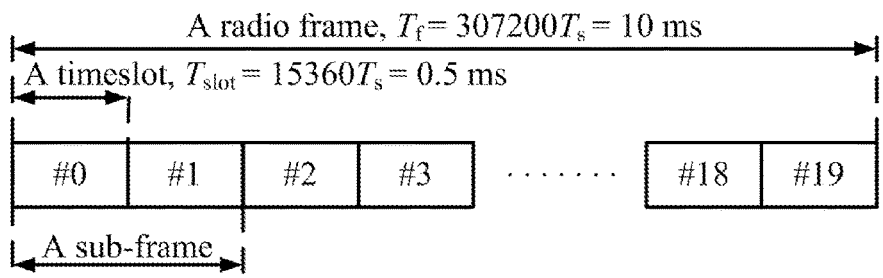
FIG. 1 is a schematic structural diagram of a frame structure type 1 according to an embodiment of the invention.

FIG. 1 is a schematic structural diagram of the frame structure type 1, and as illustrated, the existing LTE Frequency Division Duplex (FDD) system operates with the frame structure type 1 (FS1). In the FDD system, there are different carrier frequencies for uplink and downlink transmission, and there is the same frame structure for uplink and downlink transmission. Over each carrier, a radio frame with the length of 10 ms includes ten 1 ms sub-frames, and each sub-frame is subdivided into two 0.5 ms timeslots. The length of a TTI for transmitting uplink and downlink data is 1 ms.

Figure 2:
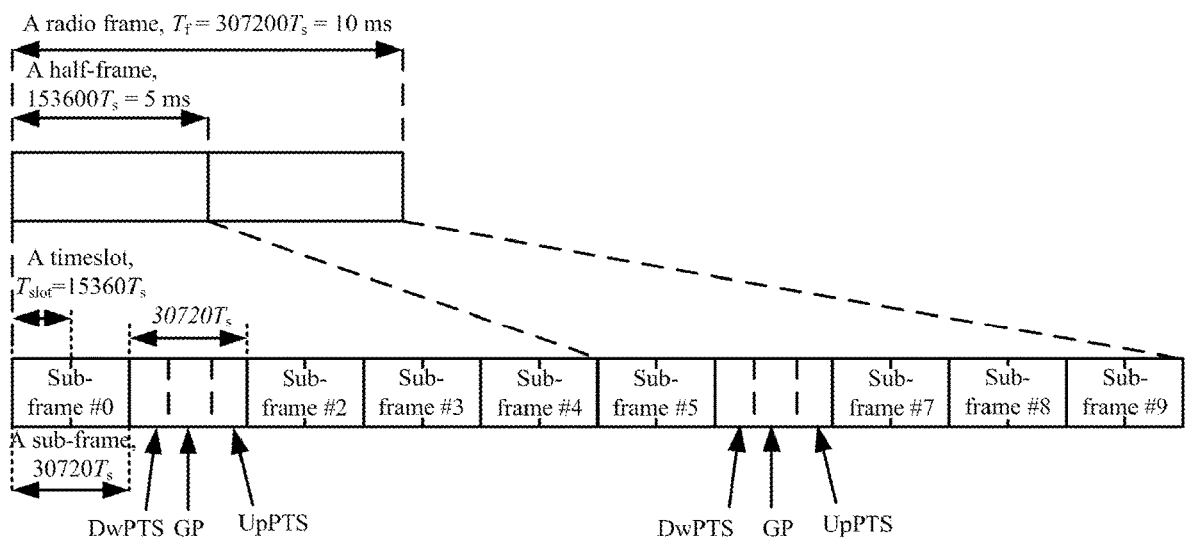
FIG. 2 is a schematic structural diagram of a frame structure type 2 according to an embodiment of the invention.

FIG. 2 is a schematic structural diagram of the frame structure type 2, and as illustrated, the existing LTE Time Division Duplex (TDD) system operates with the frame structure type 2 (FS2). In the TDD system, there are different sub-frames or different timeslots at the same frequency for uplink and downlink transmission. Each 10 ms radio frame in the FS2 includes two 5 ms half-frames, and each half-frame includes 5 sub-frames with the length of 1 ms. The sub-frames in the FS2 are categorized into three categories: downlink sub-frames, uplink sub-frames, and special sub-frames, where each sub-frame includes three components of a Downlink Pilot Time Slot (DwPTS), a Guard Period (GP), and an Uplink Pilot Time Slot (UpPTS). Here a downlink pilot, downlink service data, and downlink control signaling can be transmitted in the DwPTS; there is not any signal transmitted in the GP; and only a random access and a Sounding Reference Symbol (SRS) are transmitted in the UpPTS, but no uplink service or uplink control information can be transmitted in the UpPTS. Each half-frame includes at least one downlink sub-frame and at least one uplink sub-frame, and at most one special sub-frame. Table 1 depicts seven uplink-downlink sub-frame configuration patterns supported in the FS2.

TABLE 1

| Uplink-downlink configurations | | | | | | | | | | | |
|---|---|---|---|---|---|---|---|---|---|---|---|
| Uplink-downlink configuration | Downlink-to-Uplink Switch-point periodicity | Sub-frame number | | | | | | | | | |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |

TABLE 1-continued

| Uplink-downlink configurations | | | | | | | | | | | |
|---|---|---|---|---|---|---|---|---|---|---|---|
| Uplink-downlink configuration | Downlink-to-Uplink Switch-point periodicity | Sub-frame number | | | | | | | | | |
| | | 0 | 1 | 2 | 3 | 4 | 5 | 6 | 7 | 8 | 9 |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Figure 3:
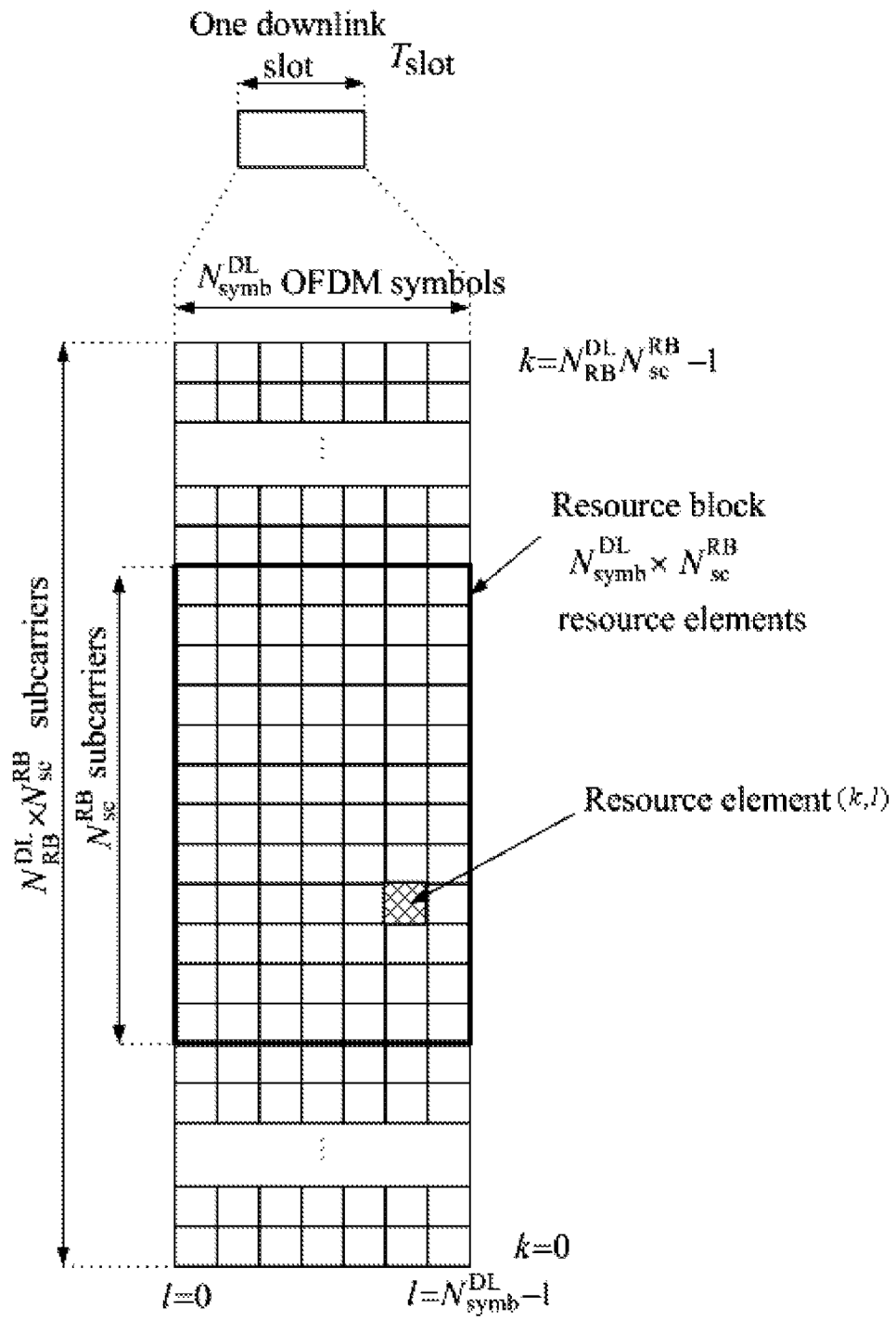
FIG. 3 is a schematic diagram of a downlink resource grid according to an embodiment of the invention.

FIG. 3 is a schematic diagram of a downlink resource grid, and as illustrated, for a downlink resource granularity in the existing LTE, the smallest resource granularity in the time domain is an OFDM symbol, and the smallest resource granularity in the frequency is a sub-carrier. (k,l) is the index of an elementary Resource Element (RE), where k=0, . . . , $N_{RB}^{DL}N_{sc}^{RB}-1$, and l=0, . . . , $N_{symb}^{DL}-1$. A Physical Resource Block (PRB) is a resource element in a larger dimension, and includes $N_{symb}^{DL} \times N_{sc}^{RB}$ REs. A sub-frame includes a PRB pair, and the PRB pair is an elementary unit at which a data resource is allocated.

The existing LTE downlink control channels will be described below.

1. PDCCH.

Scheduling information and other control information is carried in a PDCCH in the LTE system. There may be a plurality of PDCCHs in a control region in each downlink sub-frame, and the size of the control region is indicated by in a Physical Control Format Indicator Channel (PCFICH) as 1 to 4 OFDM symbols. A control channel is transmitted in a Control Channel Element (CCE) or a plurality of consecutive CCEs, each CCE includes 9 Resource Element Groups (REGs), and the REGs in the CCE(s) of the PDCCH are REGs in which neither a PCFICH nor a Physical Hybrid-ARQ (Hybrid Automatic Repeated Request) Indicator Channel (PHICH). A number of formats are supported in the PDCCH to satisfy different demands, and Table 2 below particularly depicts the supported formats.

TABLE 2

| Supported PDCCH formats | | | |
|---|---|---|---|
| PDCCH format | The number of CCEs | The number of resource-element groups | The number of PDCCH bits |
| 0 | 1 | 9 | 72 |
| 1 | 2 | 18 | 144 |
| 2 | 4 | 36 | 288 |
| 3 | 8 | 72 | 576 |

The UE monitors a non-Discontinuous Reception (DRX) sub-frame for a set of PDCCH candidates, that is, the UE attempts on decoding each PDCCH in a search space, according to a Downlink Control Indicator (DCI) format to be monitored. The search space is categorized into a UE-specific search space and a cell-specific search space, and Table 3 below depicts the possible numbers of PDCCH candidates in the different search spaces.

TABLE 3

UE monitored PDCCH candidates

| Type | Search space $S_k^{(L)}$ | | The number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

The search space $S_k^{(L)}$ at the aggregation level $L \in \{1,2,4,8\}$ includes a plurality of PDCCH candidates, and a CCE index corresponding to a PDCCH candidate is defined in the equation of:

$$L\{(Y_k+m) \bmod \lfloor N_{CCE,k}/L \rfloor\}+i,$$

where $m=0, \ldots, M^{(L)}-1$, $i=0, \ldots, L-1$, $N_{CCE,k}$ is the number of CCEs, for carrying a PDCCH, in the sub-frame k, and $Y_k$ is defined as $Y_k=(A \cdot Y_{k-1}) \bmod D$, where $Y_{-1}=n_{RNTI} \neq 0$, $A=39827$, $D=65537$, $k=\lfloor n_s/2 \rfloor$, and $n_s$ is the index of a timeslot in a radio frame.

The eNB needs to allocate a resource for a PDCCH without any confliction between different PDCCHs, that is, when some CCE or some several CCEs has or have been occupied by a PDCCH, the CCE or CCEs will not be allocated for another PDCCH any longer.

2. EPDCCH.

In order to extend a capacity of PDCCHs, an Enhanced Physical Downlink Control Channel (EPDCCH) is introduced to the 3GPP Release 11 (Rel-11). An EPDCCH is transmitted in a data region in a sub-frame instead of a transmission space of a PDCCH. Like a PDCCH, the concepts of an Enhanced Resource Element Group (EREG) and an Enhanced Control Channel Element (ECCE) have been introduced, and will be described below in details.

1) Resource Mapping of an EREG:

A PRB pair includes a fixed number 16 of EREGs indexed from 0 to 15, where the other REs than REs including an Access Point (AP) Demodulation Reference Signal (DMRS) {107, 108, 109, 110} (with a normal CP), or an AP DMRS {107, 108} (with an extended CP) are indexed sequentially from 0 to 15 under a firstly-time-and-then-frequency principle, and all the REs with the index i constitute an EREG with the index i.

2) Resource Mapping of an ECCE:

There is resource mapping of a localized ECCE to an EREG where the n-th localized ECCE is resource-mapped as follows:

The index of the EREG is:

$$n_{EREG\_index}=i \cdot N_{RB}^{ECCE}+(n \bmod N_{RB}^{ECCE});$$

The index of a PRB pair including the ECCE is:

$$n_{PRB\_index}=\lfloor n/N_{RB}^{ECCE} \rfloor;$$

where $i=0, 1, \ldots, N_{ECCE}^{EREG}-1$, $N_{RB}^{ECCE}$ represents the number of ECCEs in a PRB pair, and $N_{ECCE}^{EREG}$ represents the number of EREGs in an ECCE, where $N_{RB}^{ECCE}=16/N_{ECCE}^{EREG}$.

There is resource mapping of a distributed ECCE to an EREG where the n-th distributed ECCE is resource-mapped as follows:

The index of the EREG is:

$$n_{EREG\_index}=\lfloor n/N_{E-PDCCHset}^{RB} \rfloor+i N_{RB}^{ECCE};$$

The index of a PRB pair including the ECCE is:

$$n_{PRB\_index}=(n+i \max(1,N_{E-PDCCHset}^{RB}/N_{ECCE}^{EREG})) \bmod N_{E-PDCCHset}^{RB};$$

where $i=0, 1, \ldots, N_{ECCE}^{EREG}-1$, $N_{ECCE}^{EREG}$ represents the number of EREGs in an ECCE, $N_{E-PDCCHset}^{RB}$ represents the number of ECCEs in a PRB pair in an E-PDCCH set, and $N_{RB}^{ECCE}$ represents the number of ECCEs in a PRB pair, where $N_{RB}^{ECCE}=16/N_{ECCE}^{EREG}$.

At present, a set of aggregation levels supported in an E-PDCCH set has been established in the standard, and related to the type of the E-PDCCH set, a type of sub-frame, the number of REs, for transmitting an E-PDCCH, in a PRB pair, and other factors.

The number of blind E-PDCCH detections is defined as prescribed in the protocol, and a table of E-PDCCH candidates is created respectively for a scenario.

An E-PDCCH search space is defined in the equation of:

$$L\left\{\left(Y_{p,k}+\left\lfloor \frac{m \cdot N_{ECCE,p,k}}{L \cdot M_p^{(L)}} \right\rfloor + b\right) \bmod \lfloor N_{ECCE,p,k}/L \rfloor\right\}+i,$$

where $b=n_{CI}$, and there are $n_{CI}=0$ for intra-carrier scheduling, and $n_{CI}$ which is carrier indicator information for across-carrier scheduling.

P is a PRB set, L is an aggregation level, $m=0, 1, \ldots M_p^{(L)}-1$, and $i=0, \ldots, L-1$.

$Y_{p,-1}=n_{RNTI} \neq 0$, $A_0=39827$, $A_1=39829$, $D=65537$, and $k=\lfloor n_s/2 \rfloor$.

Stated otherwise, in the existing LTE system, the length of a TTI is fixed at 1 ms, one or more PDCCHs is or are transmitted in the first N OFDM symbols in each TTI, or transmitted in a group of PRB pairs in a data region, and the UE detects a CSS or a USS blindly for its own PDCCH according to desirable information.

However a drawback in the prior art lies in that there has been absent so far a solution to transmitting a PDCCH when the length of a TTI is variable.

In other words, as the mobile technologies are advancing, a future mobile communication system needs to provide a shorter network delay, and to support more abundant types of services, so dynamical configuration of the length of a TTI, and resources occupied in the TTI according to a service demand becomes a trend of technology development. However there has been absent a definite solution to how to transmit downlink control information in a dynamic TTI.

In view of this, the embodiments of the invention provide a method for transmitting and detecting downlink control information in a dynamic TTI.

In the following description, implementations at the UE and eNB sides will be described respectively, where a transmission process will be described for the eNB side, and a detection process will be described for the UE side, and then an implementation with cooperation between them will be further described for better understanding of the implementations of the solutions according to the embodiments of the invention. Such a description will not suggest that they shall cooperate for an implementation, or operate separately for an implementation, but in fact, when the UE and the eNB operate separately from each other in respective implementations, respective problems at the UE side and the eNB side can also be addressed respectively, and when they cooperate in an implementation, a better technical effect can be achieved.

Figure 4:
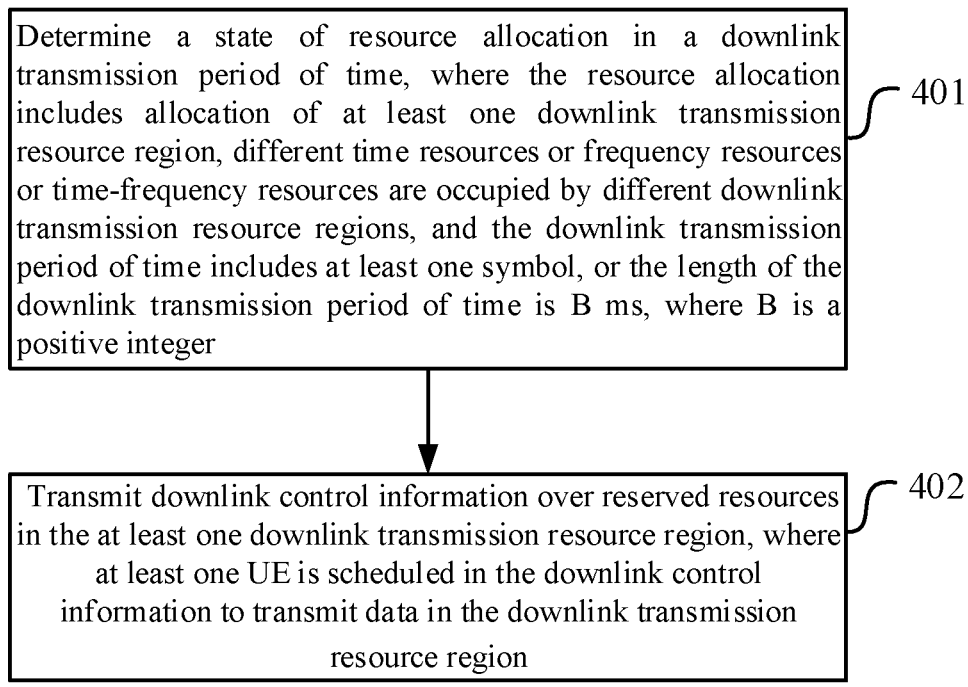
FIG. 4 is a schematic flow chart of an implementation of a method for transmitting downlink control information at the eNB side according to an embodiment of the invention.

FIG. 4 is a schematic flow chart of an implementation of a method for transmitting downlink control information at the eNB side, and as illustrated, the method can include the following steps.

The step 401 is to determine a state of resource allocation in a downlink transmission period of time, where the resource allocation includes allocation of at least one downlink transmission resource region, different time resources or frequency resources or time-frequency resources are occupied by different downlink transmission resource regions, and the downlink transmission period of time includes at least one symbol, or the length of the downlink transmission period of time is B ms, where B is a positive integer.

The step 402 is to transmit downlink control information over reserved resources in the at least one downlink transmission resource region, where at least one UE is scheduled in the downlink control information to transmit data in the downlink transmission resource region.

In an implementation, the downlink control information can include the ID of the scheduled UE, and/or the size of a data region.

In an implementation, the downlink control information can further include the size of an idle region, and an optional implementation thereof will be described below in an embodiment of the invention at the UE side.

In an optional implementation, the reserved resources for transmitting the downlink control information can be determined in one or a combination of the following schemes.

K1 sub-carriers in the frequency domain, and K2 OFDM symbols in the time domain are occupied by the downlink control information, where K1 and/or K2 are/is determined as configured via a higher layer, or K1 and/or K2 are/is determined according to one of a plurality of protocol defined combinations, or K1 and/or K2 are/is determined as signaled in a dedicated signal.

Resource positions of the reserved resources are start positions of respective elementary data transmission elements, or start positions of respective downlink transmission resource regions, or specific frequency positions in the first several OFDM symbols in the downlink transmission period of time, or all the OFDM symbols throughout the downlink transmission period of time in the time domain at a specific frequency position in the downlink transmission period of time, or other fixed positions.

In an implementation, the eNB can further transmit a preamble sequence instruction in advance, and optionally the eNB can transmit a preamble sequence in advance to instruct a UE or a group of UEs to receive the downlink control information in the downlink transmission period of time, where the preamble sequence transmitted in advance indicates the UE or the group of UE required to receive the downlink control information, so that energy consumption of the UE(s) can be reduced.

In an optional implementation, the elementary data transmission elements each are a resource block including N sub-carriers by M OFDM symbols, where N and M are positive integers.

In an optional implementation, when the resource positions of the reserved resources are specific frequency positions in the downlink transmission period of time, the frequency positions are Y Sub-Carriers (SCs) in the downlink transmission period of time, where the Y SCs can be consecutive or discrete, and Y is a positive integer.

Figure 5:
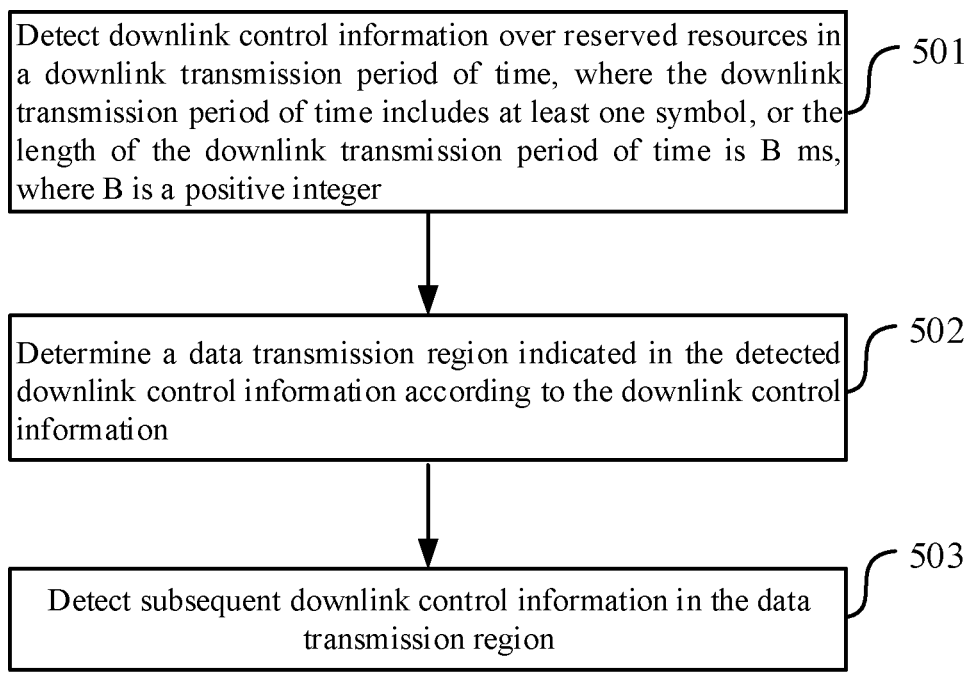
FIG. 5 is a schematic flow chart of an implementation of a method for detecting downlink control information at the UE side according to an embodiment of the invention.

FIG. 5 is a schematic flow chart of an implementation of a method for detecting downlink control information at the UE side, and as illustrated, the method can include the following steps.

The step 501 is to detect downlink control information over reserved resources in a downlink transmission period of time, where the downlink transmission period of time includes at least one symbol, or the length of the downlink transmission period of time is B ms, where B is a positive integer.

The step 502 is to determine a data transmission region indicated in the detected downlink control information according to the downlink control information.

The step 503 is to detect subsequent downlink control information in the data transmission region.

In an optional implementation, when all the UE, or a specified UE or group of UE, of the eNB detects or detect and receives or receive downlink control information over the reserved resources, the UE or UEs can know the next predetermined resource position over which downlink control information is to be detected and received, that is, the UE or UEs will not attempt to detect and receive downlink control information in the data transmission region indicated in the control information.

In an implementation, the downlink control information includes the ID of the scheduled UE, and/or the size of a data region.

In an implementation, the downlink control information further includes the size of an idle region, and the method can further include: the UE determines the data transmission region and/or the idle region indicated in the detected downlink control information according to the downlink control information, where the data transmission region and/or the idle region indicated in the downlink control information can be determined according to the first piece of detected downlink control information, or the data transmission region and/or the idle region indicated in the downlink control information can be determined according to the second piece of detected downlink control information, the third piece of detected downlink control information, etc., although the embodiment of the invention will not be limited to particularly which piece or pieces of detected downlink control information for determining the data transmission region and/or the idle region indicated in the downlink control information.

Subsequent downlink control information is detected in other than the data transmission region and/or the idle region.

Optionally, this solution addresses such a case that there are no data transmitted in a large number of idle resources in the downlink transmission period of time, that is, when a part of resources in the downlink transmission period of time are not allocated for any UE to transmit data, downlink control information will be transmitted at a start position of the idle resources, and the control information can indicate a time-frequency resource region occupied by the idle resources, so that all the UE receiving the downlink control information can know the position of the time-frequency resource region in which no downlink control information is to be received, according to information in the downlink control information about the time-frequency resource region occupied by the idle resources, thus reducing energy consumption of the UE.

In an implementation, even if the entire data region is an idle region, then the same operations will be performed at the eNB and UE sides because downlink control information is transmitted at predetermined positions all the time, and the UE can know the region in which no downlink control information is to be subsequently received, according to the downlink control information; otherwise, the UE would have further attempted to receive downlink control information at each predetermined position as in the prior art. For example, downlink control information is transmitted at the first predetermined position in the downlink transmission period of time, where the information includes the position of an idle region. The UE skips over predetermined positions at which downlink transmission period of time is to be subsequently received, according to the information. This can reduce energy consumption at the UE side.

In an optional implementation, the UE can obtain downlink transmission period of time corresponding thereto according to items in the downlink transmission period of time, and transmit downlink data according to the downlink transmission period of time corresponding thereto.

Mapping of the downlink transmission period of time starts with a sub-carrier with the lowest index, and an OFDM symbol with the lowest index, among the reserved resources all the time. The downlink transmission period of time includes at least the ID of the scheduled UE, and the size of a data region.

In an implementation, the reserved resources for detecting downlink control information are determined in one or a combination of the following schemes.

1. K1 sub-carriers in the frequency domain, and K2 OFDM symbols in the time domain are occupied by the downlink control information, where K1 and/or K2 are/is determined as configured via a higher layer, or K1 and/or K2 are/is determined according to one of a plurality of protocol defined combinations, or K1 and/or K2 are/is determined as signaled in a dedicated signal.

2. Resource positions of the reserved resources are start positions of respective elementary data transmission elements, or start positions of respective downlink transmission resource regions, or specific frequency positions in the first several OFDM symbols in the downlink transmission period of time, or all the OFDM symbols throughout the downlink transmission period of time in the time domain at a specific frequency position in the downlink transmission period of time, or other fixed positions.

Optionally, the elementary data transmission elements each are a resource block including N sub-carriers by M OFDM symbols, where N and M are positive integers.

Optionally, when the reserved resources are elementary data transmission elements, downlink control information is detected at a granularity of S1 elementary data transmission elements in the frequency domain, and S2 elementary data transmission elements in the time domain, where S1 and S2 are positive integers.

Figure 6:
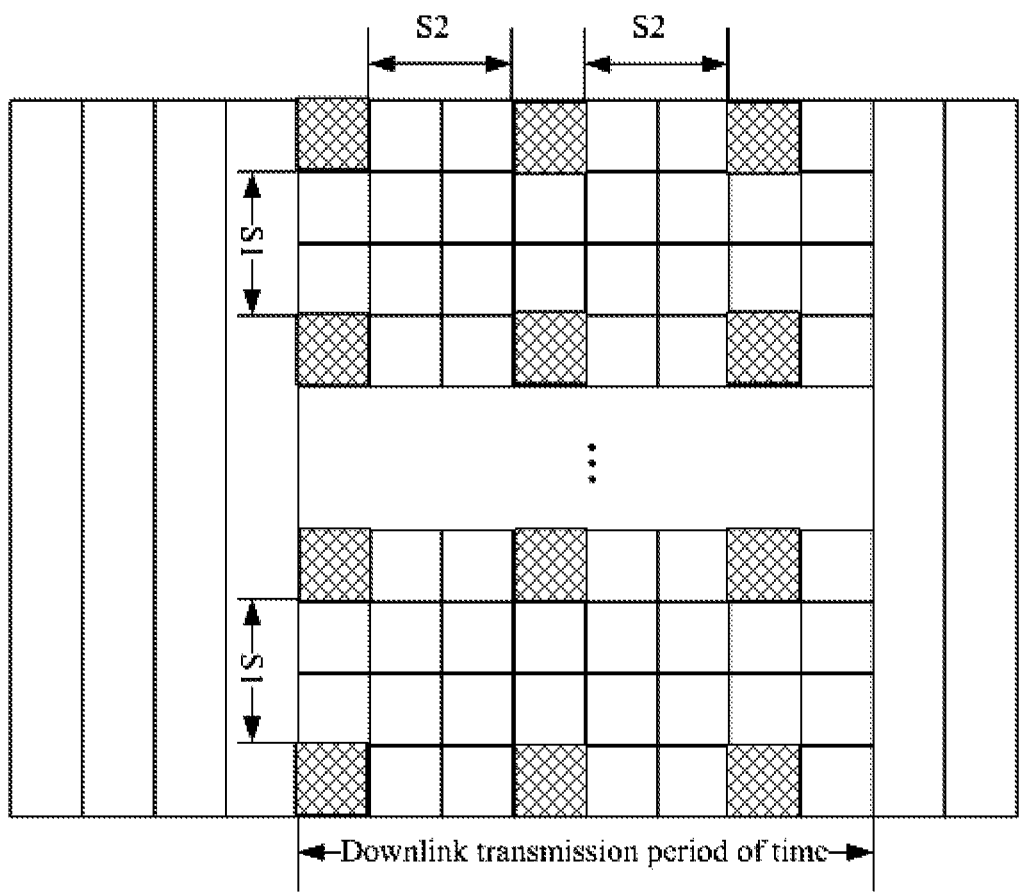
FIG. 6 is a schematic diagram of reserved resources for a UE to detect and receive downlink control information according to an embodiment of the invention.

In an optional implementation, FIG. 6 is a schematic diagram of reserved resources for a UE to detect and receive downlink control information, and as illustrated, the reserved resources are elementary data transmission elements including N sub-carriers by M OFDM symbols. The UE can detect and receive downlink control information at a granularity of S1 elementary data transmission element in the frequency domain, and S2 elementary data transmission elements in the time domain, where S1 and S2 are positive integers.

Optionally, when the reserved resources are elementary data transmission elements, the elementary data transmission elements each include a downlink control channel, or a part of a downlink control channel.

Optionally, when the resource positions of the reserved resources are specific frequency positions in the downlink transmission period of time, the frequency positions are Y SCs in the downlink transmission period of time, where the Y SCs can be consecutive or discrete, and Y is a positive integer.

In an optional implementation, downlink control information is detected at predetermined time-frequency positions in a downlink transmission period of time, and the downlink transmission period of time includes A symbols or has a length of B ms. For example, downlink control information is detected at specific frequency positions in the first X1 symbols in the downlink transmission period of time (like a legacy PDCCH), and the downlink control information can be transmitted centrally or dispersedly in the frequency domain; or transmitted throughout the length of the downlink transmission period of time over a specific frequency resource in the downlink transmission period of time (like an EPDCCH), and the specific frequency resource includes groups of Y SCs, where the Y SCs can be consecutive or discrete.

Embodiments will be described below.

First Embodiment

Figure 7:
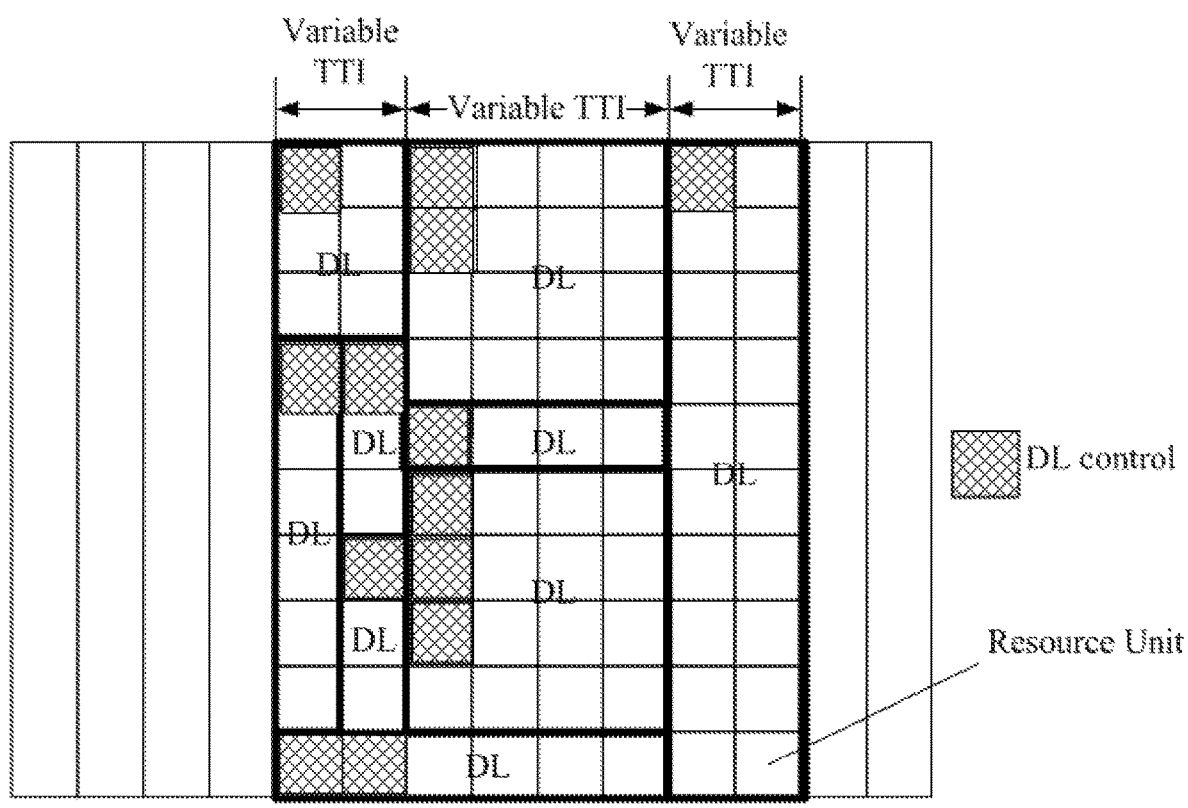
FIG. 7 is a schematic diagram of transmitting a DL control channel in a variable TTI according to an embodiment of the invention.

FIG. 7 is a schematic diagram of transmitting a DL control channel in a variable TTI, and in the embodiment illustrated in FIG. 7, a DL control channel is transmitted in the variable TTI, where both S1 and S2 are zero, for example. As illustrated, there are Z consecutive OFDM symbols in a downlink transmission period of time, and Resource Units (RUs) are elementary data transmission elements including N sub-carriers by M OFDM symbols.

The UE shall be informed in advance of time-frequency resources occupied by a DL control channel, which are K1 RUs by K2 OFDM symbols, and a UE or a group of UEs or all the UEs served by the eNB shall detect and receive a DL control channel starting with the RU with the lowest index in the downlink transmission period of time.

A DL control channel occupies a part or all of an RU starting with the first RE in the RU. A UE or a group of UEs shall attempt to detect and receive a DL control channel in all the possible RUs above. The size of the remaining data transmission region is obtained according to information carried in a downlink (DL) grant. A UE scheduled in the DL grant transmits data in the allocated data transmission region, and a UE receiving downlink control information will stop attempting to receive a DL control channel in all the RUs in a data transmission region indicated in the downlink control information. The other UEs which are not scheduled in the DL grant can also know the position of the next RU in which an attempt is to be made to receive a DL control channel, according to a data region allocation information field in the downlink control information, and skip all the RUs in the data region. The position of the next RU in which an attempt is to be made to receive a DL control channel can be obtained as follows.

Optionally, if the index of an RU in which a DL control channel is detected and received is C, and the index, of the first OFDM symbol in the RU, in the downlink transmission period of time is D, for example, then the UE will add resource scheduling information (N RUs) indicated in the DL grant to the index of the current RU, and obtain such a position of an RU, in which a DL control channel is to be detected blindly next time, that is no less than (C+N, D). The UE detects blindly in a firstly-time-and-then-frequency order.

If the index of an RU in which a DL control channel is detected and received is C, and the index, of the first OFDM symbol in the RU, in the downlink transmission period of time is D, for example, then the UE will add resource scheduling information (M RUs) indicated in the DL grant to the index of the current OFDM symbol, and obtain such a position of an RU, in which a DL control channel is to be detected blindly next time, that is no less than (C, D+M). The UE detects blindly in a firstly-time-and-then-frequency order.

Second Embodiment

Figure 8:
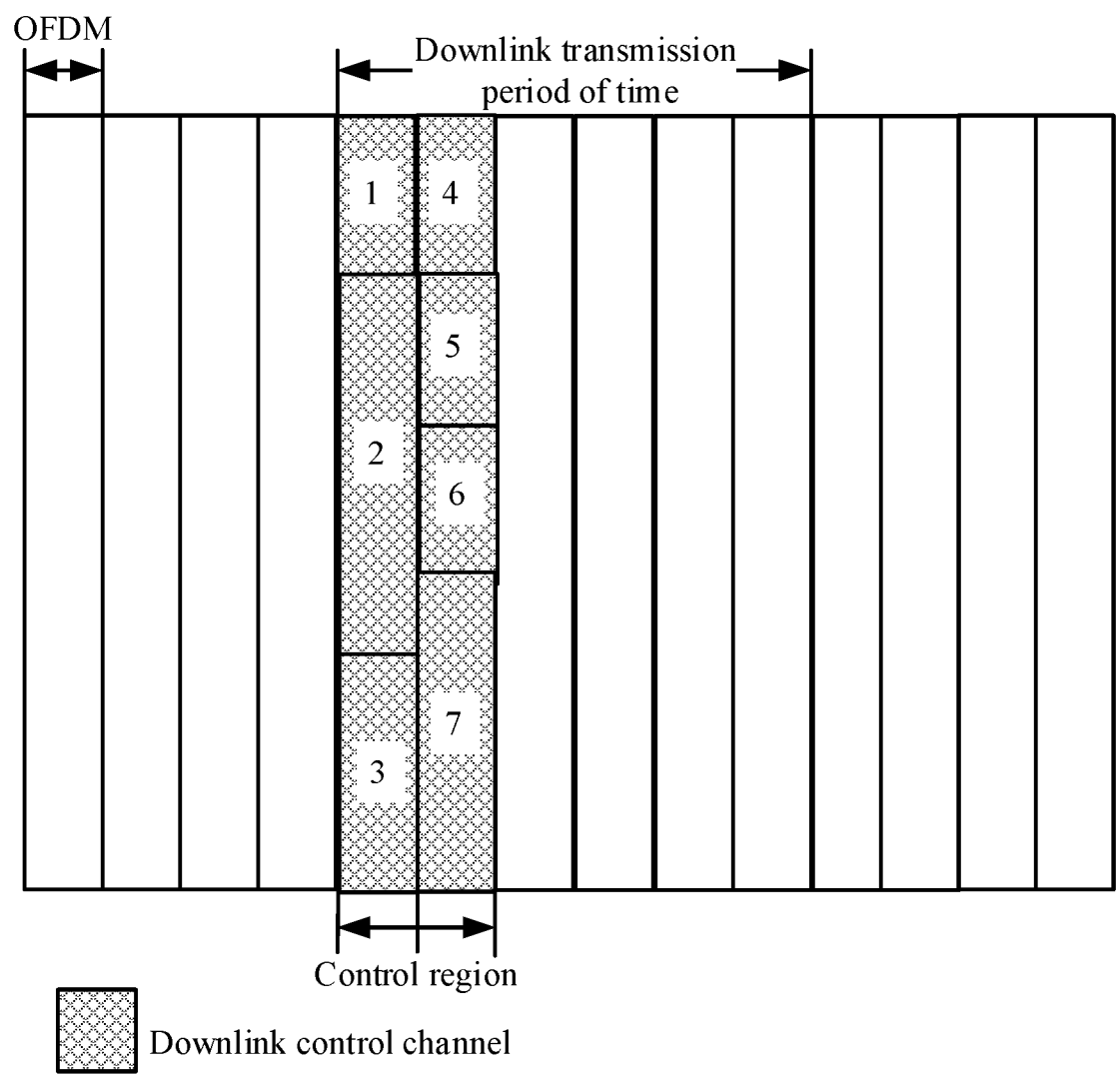
FIG. 8 is a schematic diagram of downlink control information distributed consecutively in specified OFDM symbols according to an embodiment of the invention.
Figure 9:
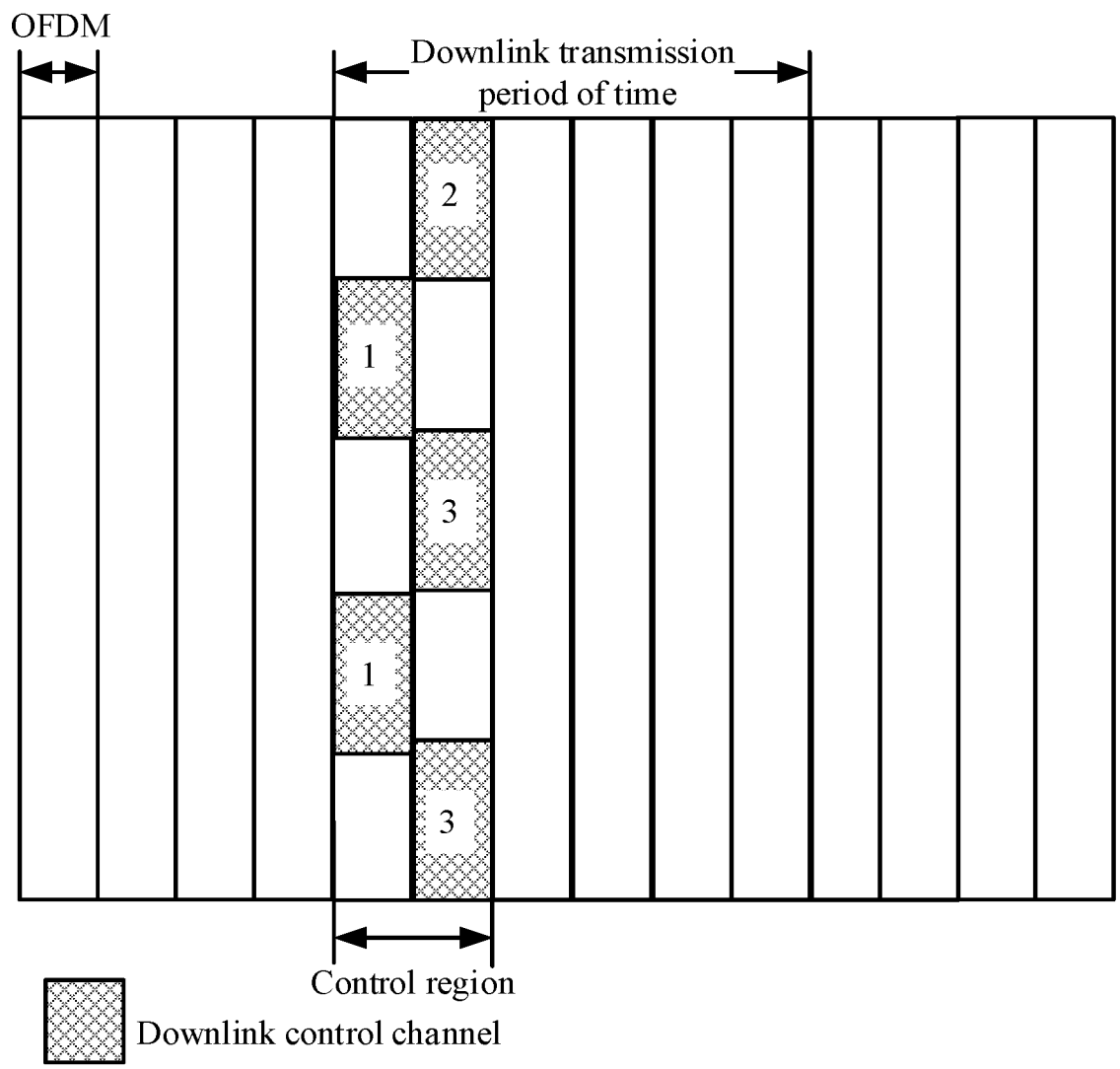
FIG. 9 is a schematic diagram of downlink control information distributed dispersedly in specified OFDM symbols according to an embodiment of the invention.

FIG. 8 is a schematic diagram of downlink control information distributed consecutively in specified OFDM symbols, and FIG. 9 is a schematic diagram of downlink control information distributed dispersedly in specified OFDM symbols; and as illustrated, the downlink control information can be distributed consecutively in the specified OFDM symbols, or can be distributed dispersedly in the specified OFDM symbols.

Downlink control information is transmitted in the first X1 OFDM symbols in the downlink transmission period of time. Downlink control information can be transmitted at specific frequency positions in the X1 OFDM symbols.

The specific frequency positions can be distributed consecutively in the frequency domain, or can be distributed uniformly throughout a frequency band. There may be one or more pieces of control information in the X1 OFDM symbols, and furthermore the resources in the downlink transmission period of time can be allocated in the control information for a scheduled UE to transmit data. The UE receiving the downlink control information can skip over a data region allocated in the downlink control information, and will not detect and receive any downlink control information at such positions in the data region that possibly there is downlink control information.

Third Embodiment

Figure 10:
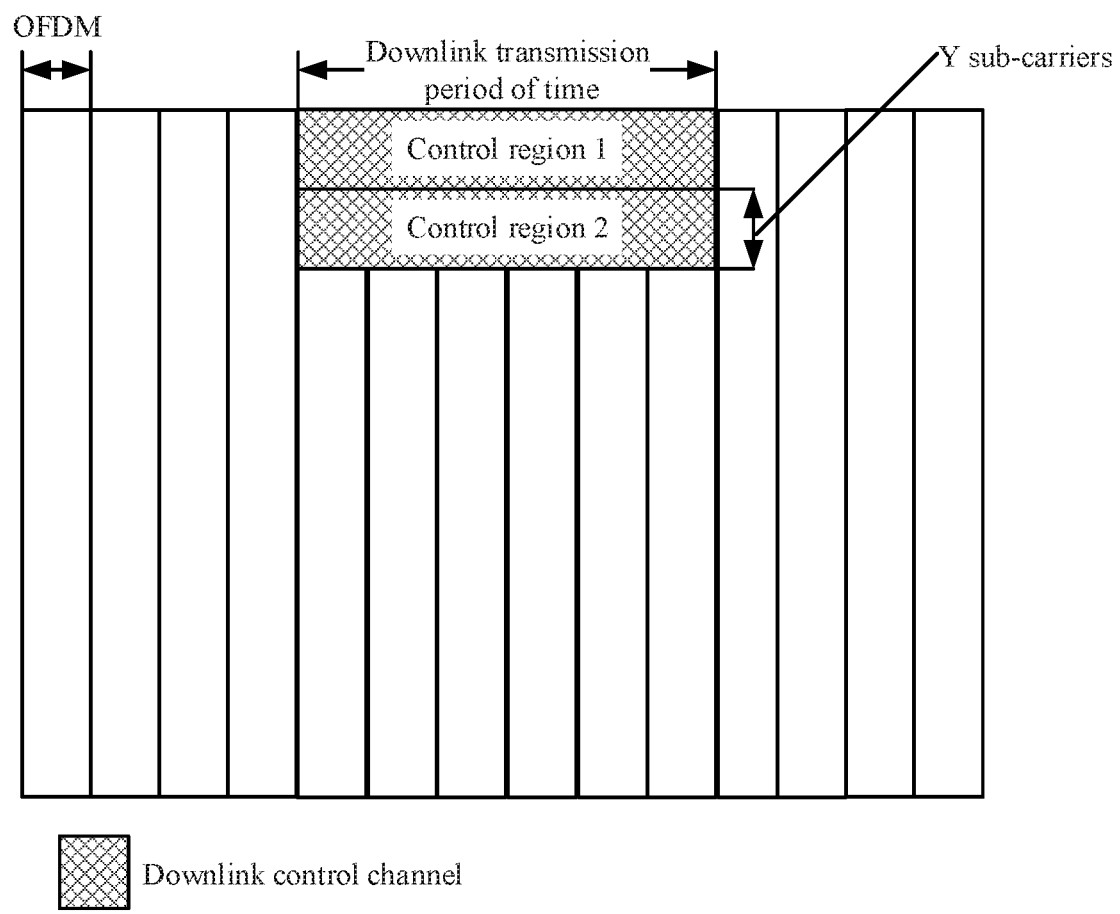
FIG. 10 is a schematic diagram of downlink control information transmitted centrally at specified resource positions according to an embodiment of the invention.
Figure 11:
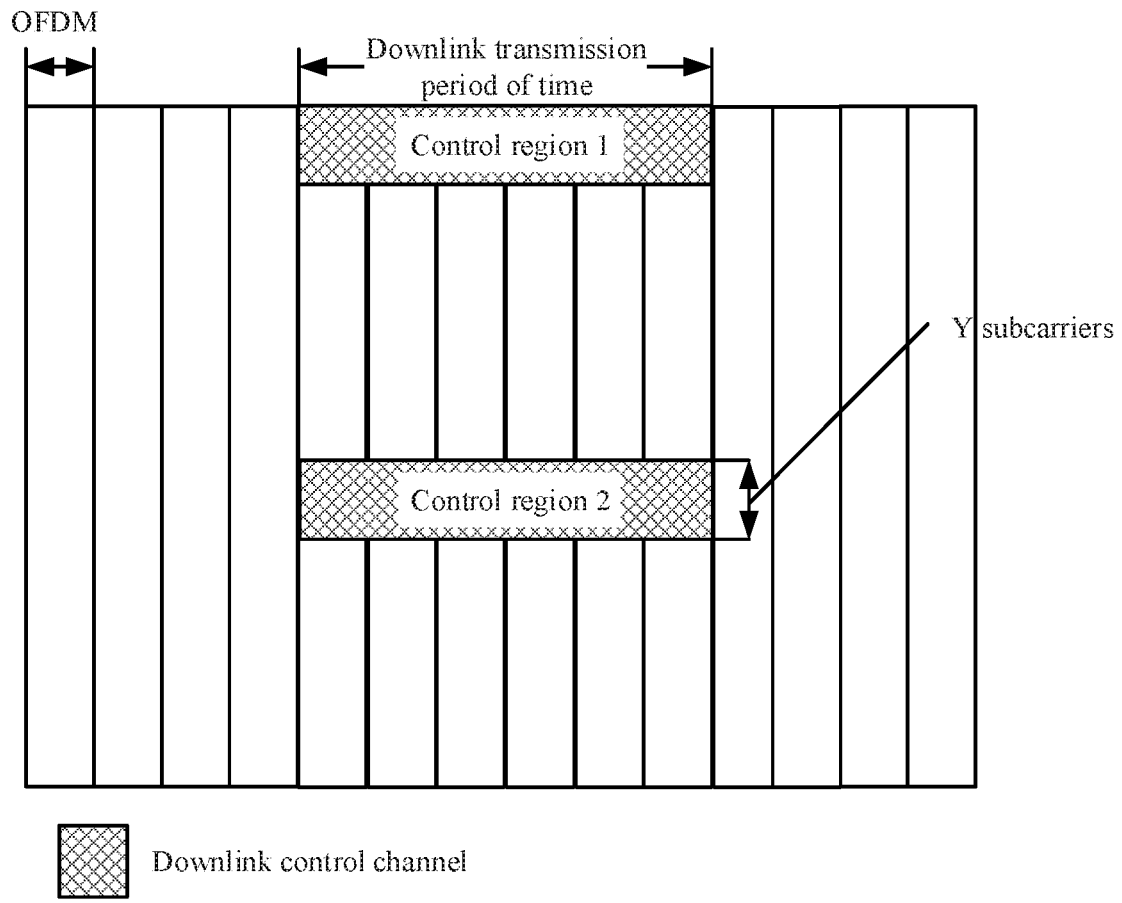
FIG. 11 is a schematic diagram of downlink control information transmitted dispersedly at specified resource positions according to an embodiment of the invention.

FIG. 10 is a schematic diagram of downlink control information transmitted centrally at specified resource positions, and FIG. 11 is a schematic diagram of downlink control information transmitted dispersedly at specified resource positions; and as illustrated, the downlink control information can be transmitted centrally at the specified resource positions, or can be transmitted dispersedly at the specified resource positions.

In the downlink transmission period of time, the control information is transmitted at fixed frequency positions in the downlink transmission period of time while occupying Y sub-carriers in the frequency domain, and all the OFDM symbols in the downlink transmission period of time in the time domain.

The downlink control information can be transmitted centrally, or can be transmitted dispersedly. A piece of downlink control information can occupy one or more of the fixed frequency positions, and furthermore the resources in the downlink transmission period of time can be allocated in the downlink control information for a scheduled UE to transmit data. The UE receiving the downlink control information can skip over a data region allocated in the downlink control information, and will not detect and receive any downlink control information at such positions in the data region that possibly there is downlink control information.

Based upon the same inventive idea, embodiments of the invention further provide an apparatus for transmitting downlink control information, and an apparatus for detecting downlink control information, and since these apparatuses address the problem under a similar principle to the method for transmitting downlink control information, and the method for detecting downlink control information, reference can be made to the implementations of the methods for implementations of these apparatuses, and a repeated description thereof will be omitted here.

Figure 12:
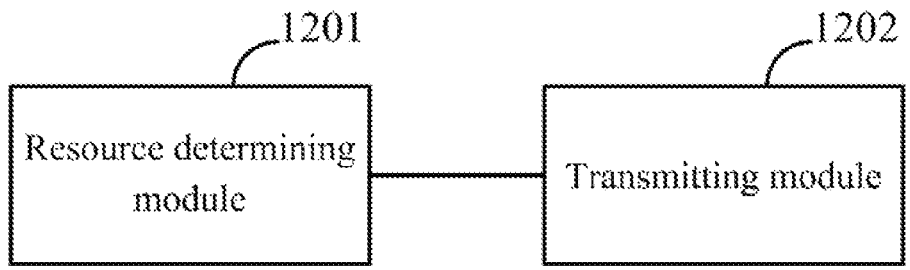
FIG. 12 is a schematic structural diagram of an apparatus for transmitting downlink control information according to an embodiment of the invention.

FIG. 12 is a schematic structural diagram of an apparatus for transmitting downlink control information, and as illustrated, the apparatus includes follows.

A resource determining module 1201 is configured to determine a state of resource allocation in a downlink transmission period of time, where the resource allocation includes allocation of at least one downlink transmission resource region, different time resources or frequency resources or time-frequency resources are occupied by different downlink transmission resource regions, and the downlink transmission period of time includes at least one symbol, or the length of the downlink transmission period of time is B ms, where B is a positive integer.

A transmitting module 1202 is configured to transmit downlink control information over reserved resources in the at least one downlink transmission resource region, where at least one UE is scheduled in the downlink control information to transmit data in the downlink transmission resource region.

In an implementation, the resource determining module is further configured to determine the reserved resources for transmitting downlink control information, in one or a combination of the following schemes.

K1 sub-carriers in the frequency domain, and K2 OFDM symbols in the time domain are occupied by the downlink control information, where K1 and/or K2 are/is determined as configured via a higher layer, or K1 and/or K2 are/is determined according to one of a plurality of protocol defined combinations, or K1 and/or K2 are/is determined as signaled in a dedicated signal.

Resource positions of the reserved resources are start positions of respective elementary data transmission elements, or start positions of respective downlink transmission resource regions, or specific frequency positions in the first several OFDM symbols in the downlink transmission period of time, or all the OFDM symbols throughout the downlink transmission period of time in the time domain at a specific frequency position in the downlink transmission period of time, or other fixed positions.

In an implementation, the elementary data transmission elements each are a resource block including N sub-carriers by M OFDM symbols, where N and M are positive integers.

In an implementation, when the resource positions of the reserved resources are specific frequency positions in the downlink transmission period of time, the frequency positions are Y SCs in the downlink transmission period of time, where the Y SCs can be consecutive or discrete, and Y is a positive integer.

In an implementation, the downlink control information includes the ID of the scheduled UE, and/or the size of a data region.

In an implementation, the downlink control information further includes the size of an idle region.

Figure 13:
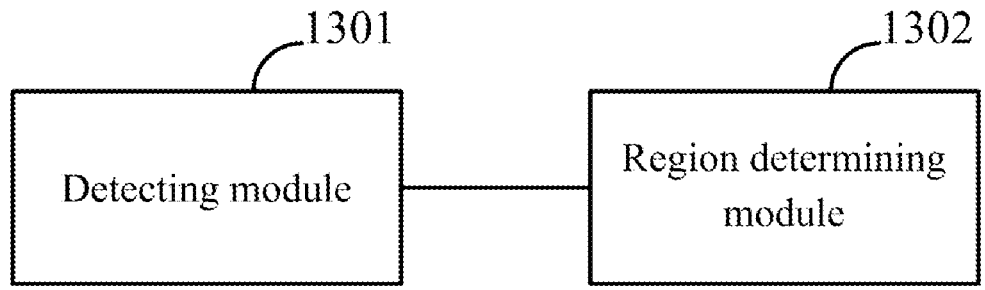
FIG. 13 is a schematic structural diagram of an apparatus for detecting downlink control information according to an embodiment of the invention.

FIG. 13 is a schematic structural diagram of an apparatus for detecting downlink control information, and as illustrated, the apparatus includes follows.

A detecting module 1301 is configured to detect downlink control information over reserved resources in a downlink transmission period of time, where the downlink transmission period of time includes at least one symbol, or the length of the downlink transmission period of time is B ms, where B is a positive integer.

A region determining module 1302 is configured to determine a data transmission region indicated in the detected downlink control information according to the downlink control information.

The detecting module 1301 is further configured to detect subsequent downlink control information in the data transmission region.

In an implementation, the detecting module is further configured to determine the reserved resources for detecting downlink control information, in one or a combination of the following schemes.

K1 sub-carriers in the frequency domain, and K2 OFDM symbols in the time domain are occupied by the downlink control information, where K1 and/or K2 are/is determined as configured via a higher layer, or K1 and/or K2 are/is determined according to one of a plurality of protocol defined combinations, or K1 and/or K2 are/is determined as signaled in a dedicated signal.

Resource positions of the reserved resources are start positions of respective elementary data transmission elements, or start positions of respective downlink transmission resource regions, or specific frequency positions in the first several OFDM symbols in the downlink transmission period of time, or all the OFDM symbols throughout the downlink transmission period of time in the time domain at a specific frequency position in the downlink transmission period of time, or other fixed positions.

In an implementation, the elementary data transmission elements each are a resource block including N sub-carriers by M OFDM symbols, where N and M are positive integers.

In an implementation, the detecting module is further configured, when the reserved resources are elementary data transmission elements, to detect downlink control information at a granularity of S1 elementary data transmission elements in the frequency domain, and S2 elementary data transmission elements in the time domain, where S1 and S2 are positive integers.

In an implementation, when the reserved resources are elementary data transmission elements, the elementary data transmission elements each include a downlink control channel, or a part of a downlink control channel.

In an implementation, when the resource positions of the reserved resources are specific frequency positions in the downlink transmission period of time, the frequency positions are Y SCs in the downlink transmission period of time, where the Y SCs can be consecutive or discrete, and Y is a positive integer.

In an implementation, the downlink control information includes the ID of the scheduled UE, and/or the size of a data region.

In an implementation, the region determining module is further configured, when the downlink control information further includes the size of an idle region, to determine the data transmission area and/or the idle area indicated in the detected downlink control information according to the downlink control information.

The detecting module is further configured to detect subsequent downlink control information in other than the data transmission area and/or the idle area.

For the sake of a convenient description, the respective components of the apparatuses above have been described respectively as respective functional modules or units. Of course, the functions of the respective modules or units can be performed in the same item or a plurality of items of software or hardware to put the invention into practice.

The technical solutions according to the embodiments of the invention can be put into practice as follows.

Figure 14:
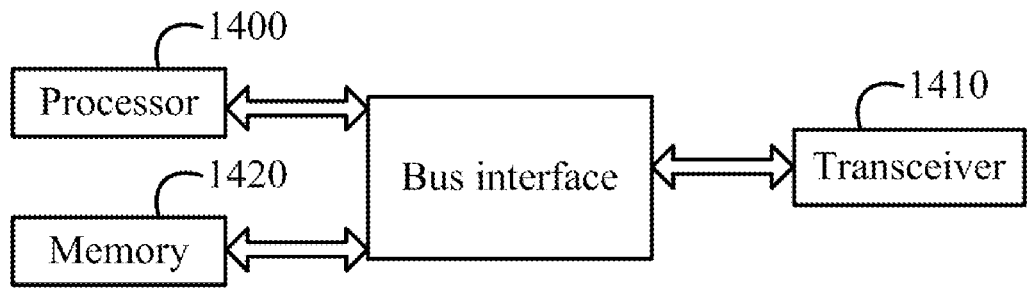
FIG. 14 is a schematic structural diagram of an eNB according to an embodiment of the invention.

FIG. 14 is a schematic structural diagram of an eNB according to an embodiment of the invention, and as illustrated, the eNB includes as follows.

A processor 1400 is configured to read and execute program in a memory 1402 to determine a state of resource allocation in a downlink transmission period of time, where the resource allocation includes allocation of at least one downlink transmission resource region, different time resources or frequency resources or time-frequency resources are occupied by different downlink transmission resource regions, and the downlink transmission period of time includes at least one symbol, or the length of the downlink transmission period of time is B ms, where B is a positive integer.

A transceiver 1410 is configured to transmit data under the control of the processor 1400 to transmit downlink control information over reserved resources in the at least one downlink transmission resource region, where at least one UE is scheduled in the downlink control information to transmit data in the downlink transmission resource region.

In an implementation, the reserved resources for transmitting downlink control information are determined in one or a combination of the following schemes.

K1 sub-carriers in the frequency domain, and K2 OFDM symbols in the time domain are occupied by the downlink control information, where K1 and/or K2 are/is determined as configured via a higher layer, or K1 and/or K2 are/is determined according to one of a plurality of protocol defined combinations, or K1 and/or K2 are/is determined as signaled in a dedicated signal.

Resource positions of the reserved resources are start positions of respective elementary data transmission elements, or start positions of respective downlink transmission resource regions, or specific frequency positions in the first several OFDM symbols in the downlink transmission period of time, or all the OFDM symbols throughout the downlink transmission period of time in the time domain at a specific frequency position in the downlink transmission period of time, or other fixed positions.

In an implementation, the elementary data transmission elements each are a resource block including N sub-carriers by M OFDM symbols, where N and M are positive integers.

In an implementation, when the resource positions of the reserved resources are specific frequency positions in the downlink transmission period of time, the frequency positions are Y SCs in the downlink transmission period of time, where the Y SCs can be consecutive or discrete, and Y is a positive integer.

In an implementation, the downlink control information includes the ID of the scheduled UE, and/or the size of a data region.

In an implementation, the downlink control information further includes the size of an idle region.

Here in FIG. 14, the bus architecture can include any number of interconnecting buses and bridges to particularly link together various circuits including one or more processors represented by the processor 1400, and one or more memories represented by the memory 1420. The bus architecture can further link together various other circuits, e.g., a peripheral device, a manostat, a power management circuit, etc., all of which are well known in the art, so a further description thereof will be omitted in this context. The bus interface serves as an interface. The transceiver 1410 can be a number of elements, e.g., a transmitter and a receiver, which are units for communication with various other devices over a transmission medium. The processor 1400 is responsible for managing the bus architecture and performing normal processes, and the memory 14620 can store data for use by the processor 1400 in performing operations.

Figure 15:
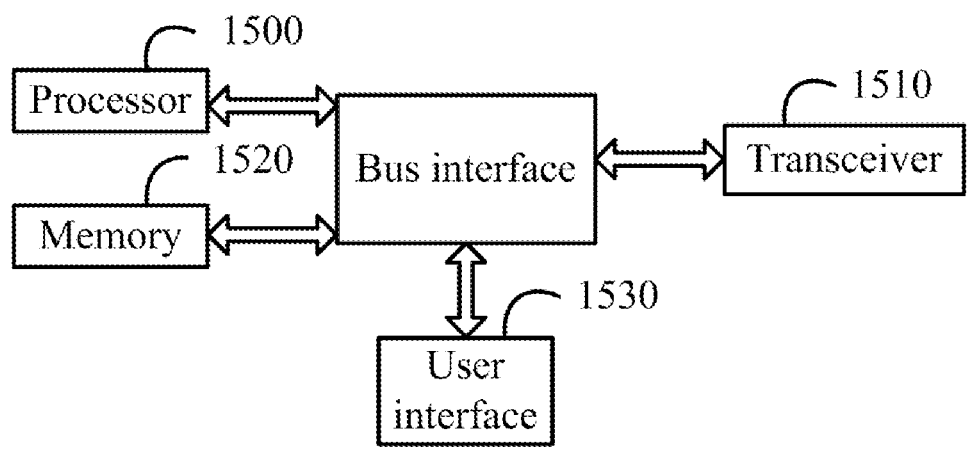
FIG. 15 is a schematic structural diagram of a UE according to an embodiment of the invention.

FIG. 15 is a schematic structural diagram of a UE according to an embodiment of the invention, and as illustrated, the UE includes follows.

A processor 1500 is configured to read and execute program in a memory 1502 to determine a data transmission region indicated in detected downlink control information according to the downlink control information.

A transceiver 1510 is configured to transmit data under the control of the processor 1500 to detect the downlink control information over reserved resources in a downlink transmission period of time, where the downlink transmission period of time includes at least one symbol, or the length of the downlink transmission period of time is B ms, where B is a positive integer; and to detect subsequent downlink control information in the data transmission region.

In an implementation, the reserved resources for detecting downlink control information are determined in one or a combination of the following schemes.

K1 sub-carriers in the frequency domain, and K2 OFDM symbols in the time domain are occupied by the downlink control information, where K1 and/or K2 are/is determined as configured via a higher layer, or K1 and/or K2 are/is determined according to one of a plurality of protocol defined combinations, or K1 and/or K2 are/is determined as signaled in a dedicated signal.

Resource positions of the reserved resources are start positions of respective elementary data transmission elements, or start positions of respective downlink transmission resource regions, or specific frequency positions in the first several OFDM symbols in the downlink transmission period of time, or all the OFDM symbols throughout the downlink transmission period of time in the time domain at a specific frequency position in the downlink transmission period of time, or other fixed positions.

In an implementation, the elementary data transmission elements each are a resource block including N sub-carriers by M OFDM symbols, where N and M are positive integers.

In an implementation, when the reserved resources are elementary data transmission elements, downlink control information is detected at a granularity of S1 elementary data transmission elements in the frequency domain, and S2 elementary data transmission elements in the time domain, where S1 and S2 are positive integers.

In an implementation, when the reserved resources are elementary data transmission elements, the elementary data transmission elements each include a downlink control channel, or a part of a downlink control channel.

In an implementation, when the resource positions of the reserved resources are specific frequency positions in the downlink transmission period of time, the frequency positions are Y SCs in the downlink transmission period of time, where the Y SCs can be consecutive or discrete, and Y is a positive integer.

In an implementation, the downlink control information includes the ID of the scheduled UE, and/or the size of a data region.

In an implementation, when the downlink control information further includes the size of an idle region, the processor is further configured to determine the data transmission area and/or the idle area indicated in the detected downlink control information according to the downlink control information; and to detect subsequent downlink control information in other than the data transmission area and/or the idle area.

Here in FIG. 15, the bus architecture can include any number of interconnecting buses and bridges to particularly link together various circuits including one or more processors represented by the processor 1500, and one or more memories represented by the memory 1520. The bus architecture can further link together various other circuits, e.g., a peripheral device, a manostat, a power management circuit, etc., all of which are well known in the art, so a further description thereof will be omitted in this context. The bus interface serves as an interface. The transceiver 1510 can be a number of elements, e.g., a transmitter and a receiver, which are units for communication with various other devices over a transmission medium. For different user equipments, the user interface 1530 can also be an interface via which a device(s) is connected externally and/or internally, where the connected device(s) includes but will not be limited to a keypad, a display, a loudspeaker, a microphone, a joystick, etc.

The processor 1500 is responsible for managing the bus architecture and performing normal processes, and the memory 1520 can store data for use by the processor 1500 in performing operations.

In summary, in the technical solutions according to the embodiments of the invention, a DL control channel is transmitted at specified fixed positions. The UE searches the respective specified fixed positions for a DL control channel, and can skip over possible DL control channel positions in a data region according to information carried in a DL grant, and obtain the next position at which a DL control channel is to be received. With these solutions, a DL control channel can be transmitted at fixed positions in each downlink transmission period of time, TTIs with various lengths can be supported, and abundant types of services in future can be better supported.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting downlink control information, the method comprising:
   determining, by an evolutional Node B (eNB), a state of resource allocation in a downlink transmission period of time, wherein the resource allocation comprises allocation of at least one downlink transmission resource region, different time resources or frequency resources or time-frequency resources are occupied by different downlink transmission resource regions, and the downlink transmission period of time comprises at least one symbol, or a length of the downlink transmission period of time is B ms, wherein B is a positive integer;
   transmitting, by the eNB, a preamble sequence to instruct a UE or a group of UEs to receive downlink control information in the downlink transmission period of time; and
   transmitting, by the eNB, the downlink control information over reserved resources in the at least one downlink transmission resource region, wherein at least one User Equipment (UE) is scheduled in the downlink control information to transmit data in the downlink transmission resource region and detects the downlink control information over the reserved resources in the downlink transmission period of time;
   wherein the reserved resources for transmitting the downlink control information are determined in a following scheme:
   K1 sub-carriers in the frequency domain, and K2 OFDM symbols in the time domain are occupied by the downlink control information, wherein K1 and/or K2 are/is determined as configured via higher layer, or K1 and/or K2 are/is determined according to one of a plurality of protocol defined combinations, or K1 and/or K2 are/is determined as signaled in a dedicated signal;
   wherein resource positions of the reserved resources are start positions of respective elementary data transmission elements, or start positions of respective downlink transmission resource regions, or specific frequency positions in the first several OFDM symbols in the downlink transmission period of time.

2. The method according to claim 1, wherein the elementary data transmission elements each are a resource block comprising N sub-carriers by M OFDM symbols, wherein N and M are positive integers.

3. The method according to claim 1, wherein when the resource positions of the reserved resources are specific frequency positions in the downlink transmission period of time, the frequency positions are Y Sub-Carriers (SCs) in the downlink transmission period of time, wherein the Y SCs can be consecutive or discrete, and Y is a positive integer.

4. The method according to claim 1, wherein the downlink control information comprises an ID of the scheduled UE, and/or a size of a data region;
   the downlink control information further comprises a size of an idle region.

5. A method for detecting downlink control information, the method comprising:
   receiving, from an evolutional Node B (eNB), a preamble sequence to instruct a UE or a group of UEs to receive downlink control information in a downlink transmission period of time
   detecting the downlink control information over reserved resources in the downlink transmission period of time, wherein the downlink transmission period of time comprises at least one symbol, or a length of the downlink transmission period of time is B ms, wherein B is a positive integer;
   determining a data transmission region indicated in the detected downlink control information according to the downlink control information; and
   obtaining subsequent reserved resource position which subsequent downlink control information is to be detected and received according to the data transmission region, and detecting the subsequent downlink control information in the data transmission region;
   wherein the reserved resources for detecting the downlink control information are determined in a following scheme:
   K1 sub-carriers in the frequency domain, and K2 OFDM symbols in the time domain are occupied by the downlink control information, wherein K1 and/or K2 are/is determined as configured via a higher layer, or K1 and/or K2 are/is determined according to one of a plurality of protocol defined combinations, or K1 and/or K2 are/is determined as signaled in a dedicated signal;
   wherein resource positions of the reserved resources are start positions of respective elementary data transmission elements, or start positions of respective downlink transmission resource regions, or specific frequency positions in the first several OFDM symbols in the downlink transmission period of time.

6. The method according to claim 5, wherein the elementary data transmission elements each are a resource block comprising N sub-carriers by M OFDM symbols, wherein N and M are positive integers; and when the reserved resources are elementary data transmission elements, the downlink control information is detected at a granularity of S1 elementary data transmission elements in the frequency domain, and S2 elementary data transmission elements in the time domain, wherein S1 and S2 are positive integers.

7. The method according to claim 5, wherein when the reserved resources are elementary data transmission elements, the elementary data transmission elements each comprise a downlink control channel, or a part of a downlink control channel; or when the resource positions of the reserved resources are specific frequency positions in the downlink transmission period of time, the frequency positions are Y Sub-Carriers (SCs) in the downlink transmission period of time, wherein the Y SCs can be consecutive or discrete, and Y is a positive integer.

8. The method according to claim 5, wherein the downlink control information comprises an ID of the scheduled UE, and/or a size of a data region;
when the downlink control information further comprises a size of an idle region, the method further comprises:
determining a data transmission area and/or an idle area indicated in the detected downlink control information according to the downlink control information; and
detecting subsequent downlink control information in other than the data transmission area and/or the idle area.

9. An apparatus for transmitting downlink control information, the apparatus comprising a memory configured to store computer-readable programs and a processor configured to execute the computer-readable programs to:
determine a state of resource allocation in a downlink transmission period of time, wherein the resource allocation comprises allocation of at least one downlink transmission resource region, different time resources or frequency resources or time-frequency resources are occupied by different downlink transmission resource regions, and the downlink transmission period of time comprises at least one symbol, or a length of the downlink transmission period of time is B ms, wherein B is a positive integer;
transmit a preamble sequence to instruct a UE or a group of UEs to receive the downlink control information in the downlink transmission period of time; and
transmit the downlink control information over reserved resources in the at least one downlink transmission resource region, wherein at least one User Equipment (UE), is scheduled in the downlink control information to transmit data in the downlink transmission resource region and detects the downlink control information over the reserved resources in the downlink transmission period of time;
wherein the processor is further configured to execute the computer-readable programs to determine the reserved resources for transmitting the downlink control information, in a following scheme:
K1 sub-carriers in the frequency domain, and K2 OFDM symbols in the time domain are occupied by the downlink control information, wherein K1 and/or K2 are/is determined as configured via higher layer, or K1 and/or K2 are/is determined according to one of a plurality of protocol defined combinations, or K1 and/or K2 are/is determined as signaled in a dedicated signal;
wherein resource positions of the reserved resources are start positions of respective elementary data transmission elements, or start positions of respective downlink transmission resource regions, or specific frequency positions in the first several OFDM symbols in the downlink transmission period of time.

10. The apparatus according to claim 9, wherein the elementary data transmission elements each are a resource block comprising N sub-carriers by M OFDM symbols, wherein N and M are positive integers.

11. The apparatus according to claim 9, wherein when the resource positions of the reserved resources are specific frequency positions in the downlink transmission period of time, the frequency positions are Y Sub-Carriers (SCs) in the downlink transmission period of time, wherein the Y SCs can be consecutive or discrete, and Y is a positive integer.

12. The apparatus according to claim 9, wherein the downlink control information comprises an ID of the scheduled UE, and/or a size of a data region;
the downlink control information further comprises a size of an idle region.

13. An apparatus for detecting downlink control information, the apparatus comprising a memory configured to store computer-readable programs and a processor configured to execute the computer-readable programs to:
receive, from an evolutional Node B (eNB), a preamble sequence to instruct a UE or a group of UEs to receive downlink control information in a downlink transmission period of time;
detect the downlink control information over reserved resources in the downlink transmission period of time, wherein the downlink transmission period of time comprises at least one symbol, or a length of the downlink transmission period of time is B ms, wherein B is a positive integer;
determine a data transmission region indicated in the detected downlink control information according to the downlink control information; and
obtain subsequent reserved resource position which subsequent downlink control information is to be detected and received according to the data transmission region, and detect the subsequent downlink control information in the data transmission region;
wherein the processor is further configured to execute the computer-readable programs to determine the reserved resources for detecting the downlink control information, in a following scheme:
K1 sub-carriers in the frequency domain, and K2 OFDM symbols in the time domain are occupied by the downlink control information, wherein K1 and/or K2 are/is determined as configured via higher layer, or K1 and/or K2 are/is determined according to one of a plurality of protocol defined combinations, or K1 and/or K2 are/is determined as signaled in a dedicated signal;
wherein the downlink control information comprises an ID of the scheduled UE, and/or a size of a data region;
wherein resource positions of the reserved resources are start positions of respective elementary data transmission elements, or start positions of respective downlink transmission resource regions, or specific frequency positions in the first several OFDM symbols in the downlink transmission period of time.

14. The apparatus according to claim 13, wherein the elementary data transmission elements each are a resource block comprising N sub-carriers by M OFDM symbols, wherein N and M are positive integers; and the processor is further configured to execute the computer-readable programs, when the reserved resources are elementary data transmission elements, to detect the downlink control information at a granularity of S1 elementary data transmission elements in the frequency domain, and S2 elementary data transmission elements in the time domain, wherein S1 and S2 are positive integers.

15. The apparatus according to claim 13, wherein when the reserved resources are elementary data transmission elements, the elementary data transmission elements each comprise a downlink control channel, or a part of a downlink control channel; or
when the resource positions of the reserved resources are specific frequency positions in the downlink transmission period of time, the frequency positions are Y Sub-Carriers (SCs) in the downlink transmission period of time, wherein the Y SCs can be consecutive or discrete, and Y is a positive integer.

16. The apparatus according to claim 13, wherein the downlink control information comprises an ID of the scheduled UE, and/or a size of a data region;

the processor is further configured to execute the computer-readable programs, when the downlink control information further comprises a size of an idle region, to determine a data transmission area and/or an idle area indicated in the detected downlink control information according to the downlink control information; and detect subsequent downlink control information in other than the data transmission area and/or the idle area;

the downlink control information is transmitted at a start position of the idle area.

* * * * *